US00RE34824E

United States Patent [19]

Morrison et al.

[11] E Patent Number: Re. 34,824

[45] Reissued Date of Patent: Jan. 10, 1995

[54] VIDEO CODER

[75] Inventors: David G. Morrison; Andrew P. Heron; David O. Beaumont, all of Ipswich, England

[73] Assignee: British Telecommunications public limited company, London, England

[21] Appl. No.: 4,082

[22] PCT Filed: Sep. 23, 1988

[86] PCT No.: PCT/GB88/00789

§ 371 Date: May 17, 1989

§ 102(e) Date: May 17, 1989

[87] PCT Pub. No.: WO89/03153

PCT Pub. Date: Apr. 6, 1989

Related U.S. Patent Documents

Reissue of:

[64] Patent No.: 4,985,766
Issued: Jan. 15, 1991
Appl. No.: 358,370
Filed: Sep. 23, 1988

[30] Foreign Application Priority Data

Sep. 23, 1987 [GB] United Kingdom ..... 8722394

[51] Int. Cl.[6] ..... H04N 7/133; H04N 7/137

[52] U.S. Cl. ..... 348/419; 348/400; 348/423

[58] Field of Search ..... 358/133, 135, 136, 141, 358/138; H04N 7/133, 7/137; 348/419, 400, 423

[56] References Cited

U.S. PATENT DOCUMENTS 4,394,774 7/1983 Widergren et al. .
4,454,546 6/1984 Mori .
4,517,596 5/1985 Suzuki .
4,580,162 4/1986 Mori .
4,694,336 9/1987 Keesen et al. .
4,727,421 2/1988 Koga .
4,734,767 3/1988 Kaneko et al. .
4,757,383 7/1988 Tanaka .
4,792,981 12/1988 Cahill, III et al. .
4,827,338 5/1989 Gerard .

FOREIGN PATENT DOCUMENTS 0103380 3/1984 European Pat. Off. .
0180345 7/1986 European Pat. Off. .
2173067 10/1986 United Kingdom .
WO87/02854 5/1987 WIPO .

OTHER PUBLICATIONS

IEEE Conference on Communications, Denver Colo., Jun. 14–18, 1981, Conference Record, pp. 22.4.1–22.4.5, "An Architecture for Hybrid Coding of NTSC TV Signals", A. Jalali, K. R. Rao.

(List continued on next page.)

*Primary Examiner*—Howard W. Britton
*Attorney, Agent, or Firm*—Nixon & Vanderhye

[57] ABSTRACT

A coder assembles bursts of blocks of image data (e.g. transform coded coefficients) and associated overhead data into a sequence of data which are then transmitted. Both the transform coded coefficients and the overhead data are initially stored in separate FIFO memory stores (21), (22). The blocks of transform coded coefficients have a 'last coefficient' flag accompanying the last coefficient, and the overhead information contains a unique word SWITCH, after the header information but before the 'end-of-block' flag. The 'last coefficient' flag and the SWITCH word are recognized by a toggle controller (29) which controls the reading of the stores so that the coefficient data and overhead data are selectively passed to a buffer (30) in a desired sequence. The buffer (30) is followed by a variable length coder (31) which supplies the output of the coder at a constant bit rate. Provision (34–38) is made to calculate the quantity of output data represented at any time by the contents of the buffer and the result is used to control the rate of generation of image data.

15 Claims, 3 Drawing Sheets

OTHER PUBLICATIONS

Japan Telecommunications Review, vol. 21, No. 2, Apr. 1979, M. Mizui et al. "Commercialized Interframe CODEC for NTSC Color Video Signals", pp. 109–117.

IEEE International Conference on Communications, Jun. 22–25, 1986, Toronto, Calif., vol. 1, IEEE (New York, U.S.), J. Guichard et al: "Intra and Interframe Transform Coding for Moving Pictures Transmission", pp. 381–834.

IEEE Global Telecommunications Conference, Dec. 1–4, 1986, Houston, Tex., vol. 1, IEEE (New York, U.S.), M. Ohta et al: "Adaptive VWL Coding of Transform Coefficients for Sub–Primary Rate Video Transmission," pp. 271–275.

IEEE Transaction on Acoustics, Speed and Signal Processing, vol. ASSP–32, No. 1, Feb. 1984, IEEE (New York), K. N. Nagan: "Image Display Techniques Using the Cosine Transform", pp. 173–177.

VIDEO CODER

Matter enclosed in heavy brackets [ ] appears in the original patent but forms no part of this reissue specification; matter printed in italics indicates the additions made by reissue.

This application is related to copending, commonly assigned, U.S. patent application No. 07/326,663 filed Mar. 3, 1989 entitled "Data Encoding" and naming Messrs. Morrison and Heron as joint inventors.

This invention relates to a video coder, and in particular, though not exclusively, to a coder employing conditional replenishment techniques whereby data representing changes in an image between frames are sent to update a stored image at a decoder.

Transform coding may also be employed, where typcially each frame of an image to be coded comprises an array of picture elements (pels) which are divided into blocks of N×M pels. Each block of pels is transform coded, for instance by applying a discrete cosine transform (DCT). In general, a block of N×M pels will be transformed into an array of N×M coefficients. The resulting array of coefficients is then quantised by dividing each coefficient by a variable quantisation factor. The quantised coefficients may be coded in variable length code, for instance a Huffman code. Several variable length code books may be available, in which case a decision about which is chosen to be used for a particular coefficient is made depending on the statistics of the coefficients.

In such coding schemes, data is generated at an irregular rate at the transmitter, and an output buffer memory is generally used to ensure that transmission takes place at a uniform data rate.

The fullness of the output buffer may be used to determine the quantisation factor so that, when the buffer fills, the quantisation factor is increased. Conversely, when the buffer empties, the quantisation factor may be decreased.

It is also common practice not to send coefficients representing every block of every frame of the image, but to send them only for those blocks where changes have occurred, with respect to the preceding corresponding block, that exceed a threshold. The threshold may also be determined as a function of the output buffer memory's fullness.

Problems arise where overhead information is to be incorporated into the data stream prior to variable length coding and transmission.

According to one aspect of the present invention, there is provided a video coder comprising:

first coding means for generating, for blocks of picture elements of an image to be coded, image data indicative of the state of those elements;

second coding means for generating overhead data in respect of blocks and/or in respect of groups of blocks of picture elements, the overhead data including information as to the nature of coding employed by the first coding means;

a first buffer memory for storing the image data; a second buffer memory for storing the overhead data; means for inserting flags into the first and second buffer memories; and means for selectively reading data from either the first buffer or the second buffer memory, the reading means being responsive to the occurrence of a flag in the buffer memory being read to cease reading from that memory and to commence reading from the other memory, such that a desired sequence of image and overhead data is obtained.

In another aspect, the invention provides a video coder comprising:

means for generating from an input video signal data at a variable rate;

variable length coding means for encoding the data using a variable length code;

a buffer for interfacing to an output supplying data at a constant rate;

control means for controlling readout of data from the buffer, characterised in that the buffer precedes the variable length coding means, and that the control means 33, 34 is arranged to read from the buffer at a rate such that the rate of the encoded data is constant.

The invention will now be described by way of example with reference to the following figures in which.

Figure 1:
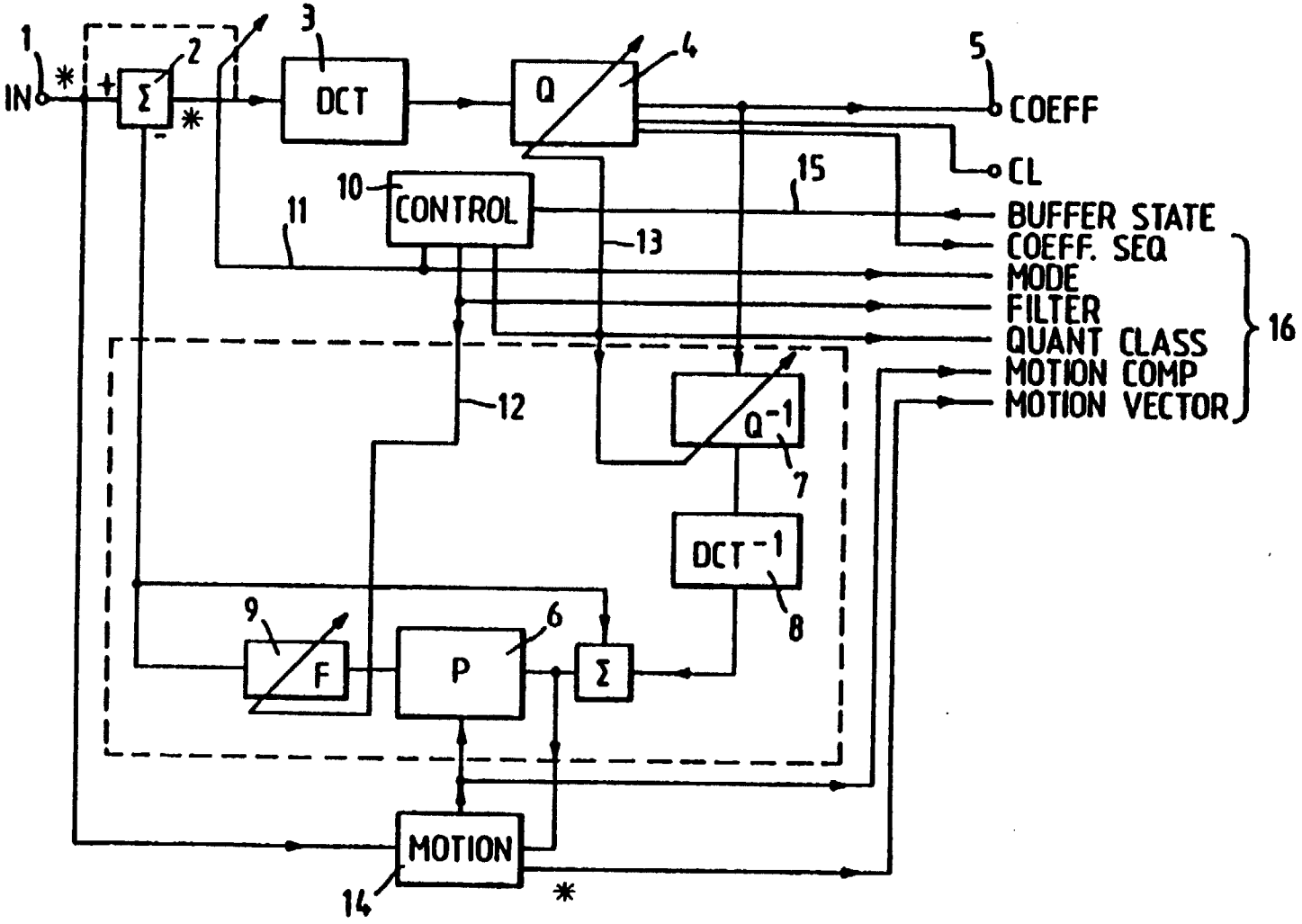
FIG. 1 is a block diagram of the first stages of a video coder.

FIG. 1 illustrates the front end of a video coder. Digital video input signals are supplied via an input 1 and are differentially coded by subtraction in a subtractor 2 of a predicted picture element value from the actual picture element value received. The difference values are then coded by a transform coder 3 in which N×M (e.g. 8×8) blocks of elements are subjected to a transform, e.g. the discrete cosine transform (DCT), to produce a like number N×M of coefficients. The coefficients are quantised 4 and fed to an output 5. It is noted for future reference that the quantiser 4 may be arranged to output coefficients only up to the last non-zero coefficient of a block; indeed, if the prediction error is zero or small for a particular block, it may be that no coefficients will be output for the block. Moreover it may vary the sequence of output in order to reduce the number of coefficients encoded, e.g. in the manner described in our co-pending International patent application no. PCT/GB88/00519 and European patent application no. 88306060.0.

The predictive coding is essentially inter-frame, and the predictor essentially comprises a frame store 6. However, in order to avoid errors at the receiver the transform coding and quantisation are included (as is conventional) within the predictor loop which thus includes an inverse quantiser 7, and inverse transform coder 8; also a filter 9—the items within the dotted lines in FIG. 1 form a local decoder.

In relation to the inverse quantiser 7, it is not of course possible to recover information lost by quantisation; the inverse quantiser is to be understood as reversing any non-linearity and any other reversible coding functions carried out by the quantiser. The arrangement shown in FIG. 1 is adaptive—ie the manner of coding is varied in dependence on the picture content. This is illustrated as being carried out by a control unit 10 which is assumed also to decide which blocks have a sufficiently low difference from the previous frame that they need not be encoded by the quantiser at all. Possible variations are:

switching between differential and absolute coding (control line 11)

variation of the parameters of the filter (control line 12)

variation of the quantiser characteristics; also variation of other coding functions which may be incorporated in the quantiser, such as varying the sequence in which the coefficients are transmitted (control line 13).

the coder might also incorporate motion compensation indicated generally by motion compensation unit 14 and this again might be adaptive. For simplicity, the inputs to the control unit 10 are not shown. A later part of the coder includes a buffer to ensure a constant transmitted data rate despite the irregular rate at which the data are generated, and the buffer state is communicated to the control unit (line 15) so that the average rate of generation can be adjusted to prevent overflow or underflow of the buffer. Additionally, the control unit 10 may have inputs connected to one or more of the points marked * according to the function which it is to perform. All these functions are known per se and will not, therefore be discussed in detail. Clearly it is necessary for information indicating the type of coding which has been used to be supplied to the receiver to which the data is to be sent, and the front end section of FIG. 1 has outputs 16 for such overhead information.

The overhead information (or block header) to be transmitted for a block is assumed to comprise:

Block position—calculated later

Mode (intra/interframe)—from control line 11

Filter data—from control line 12

Type of quantisation—from quantiser 4

Code indicating whether motional compensation is used Block motion Vector—from motion compensation unit 14

Coefficient sequence—from quantiser 4 Also output is a signal CL which indicates if no coefficients are being output for that block.

In the arrangement shown in FIG. 1, video signals are processed in real time.

A block of N×M picture elements gives rise to a block of N×M coefficients; hence the instantaneous rate at which coefficients are generated is the video picture element rate (e.g. 5.37 MHz) although the average rate of generation (which is variable) will be lower due to non-transmission of (a) data for unchanged blocks and (b) trailing zero-valued coefficients.

It is assumed that the overhead information are generated in blocks which correspond to blocks of the picture. The possibility of also generating overhead blocks for a complete picture or groups of blocks within a picture will be discussed later.

It is assumed that variable length coding is to be used for transmission of the coefficients. The coder needs to (i) carry out the variable length coding (ii) assemble the coefficient and overhead information in a desired sequence (iii) buffer the data, whose generation rate will vary due to the factors discussed above, as well as the variable length coding, to interface to a desired constant output data rate.

In principle it would be possible to buffer the coefficients and overheads separately and read them out at output clock rate; however, for any block, overheads may be present without coefficients, or both may be absent, or (where picture or group overheads are present) coefficients may be present without block overheads. This, together with the variable length coding, makes buffer fullness control a complex operation.

Figure 2:
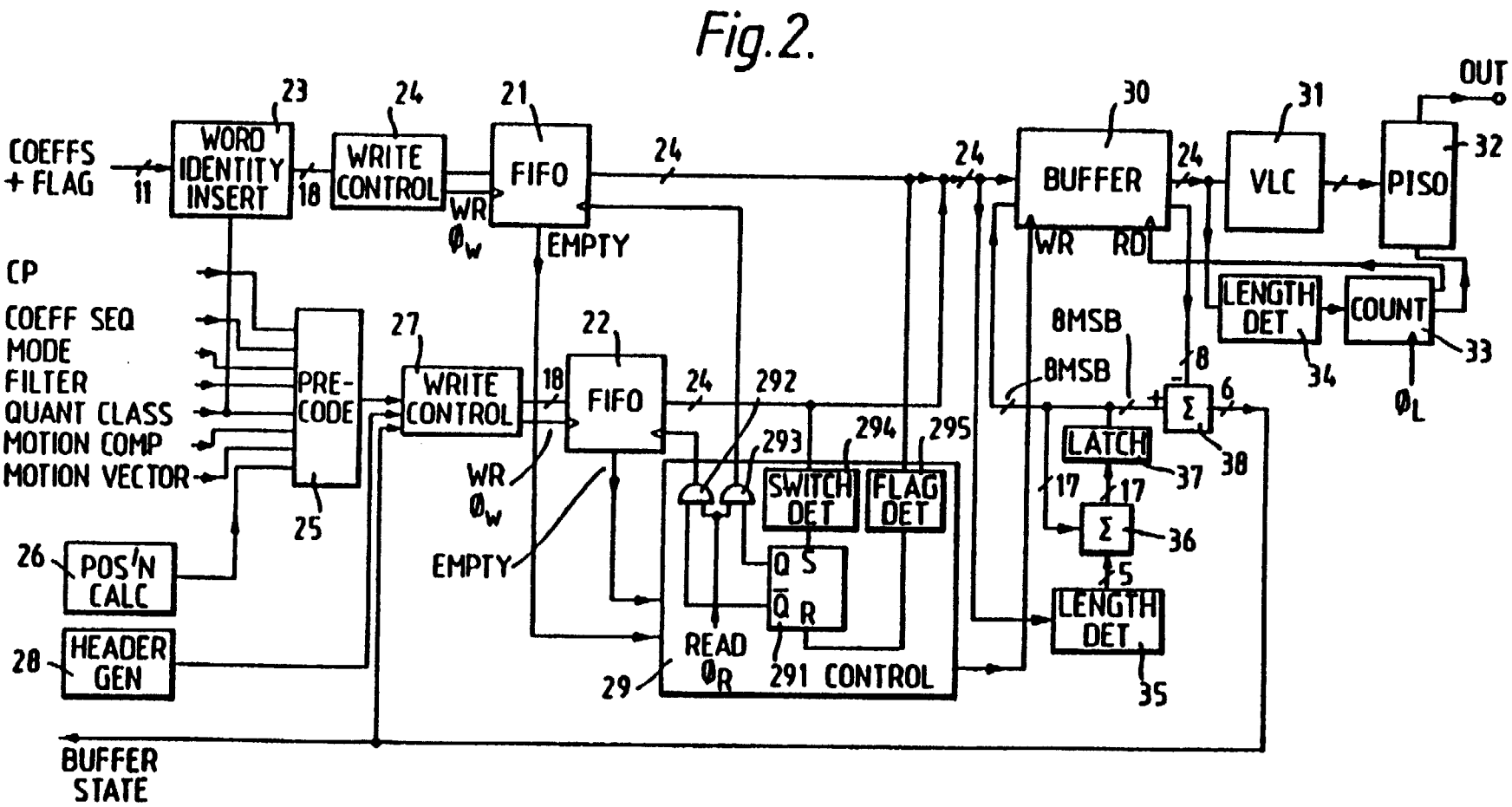
FIG. 2 shows a functional block diagram of a coder incorporating a preferred embodiment of the invention.

Therefore the next stage of the coder, as shown in FIG. 2, serves to assemble the coefficient data and overheads. The coefficient data and overheads are written into respective first-in, first-out (FIFO) stores 21, 22 at video rate. They are read out selectively at an instantaneous rate which is higher by a sufficient margin that the stores never overfill. Conveniently this may be made a multiple of the coder output clock rate—which typically may be from 384 -kbit/s to 1.544 or 2.048 Mbit/s—in the latter two cases a read rate of 6.144 or 6.176 Mhz might be used. The lines connecting the elements of in FIG. 2 are marked with numerals indicating the number of parallel data connections in that link; i some instances where only one connection is made the signal carried has been indicated.

Coefficient data are received from the output 5 of FIG. 1 (with a "last coefficient" flag appended to the last coefficient of a block). Before entry of the data into the store, a VLC select, or word identify, code is added to each coefficient by a VLC insertion unit 23, according to the information provided by the 'quantisation class' output from FIG. 1. This identifies, for later use, which one of a number of variable length code sets is to be used for quantising the coefficient. The coefficient data and word identity codes are written into the FIFO store 21 by a write control unit 24.

Meanwhile, the overhead data are assembled into a sequence by a precoder 25, along with a block position code from a position calculator 26 (synchronised with the operation of the front end of FIG. 1) and word identity codes for determining the VLC code set to be used. It forwards this to a write control unit 27, along with the signal CL.

Although not in principle essential, the coder may provide for the coding of overhead information in respect of a complete frame of the picture, or of a group of blocks. Typically these may include some or all of the following viz:

a picture header which occurs at the start of the picture;

a group header which precedes a group of blocks; and a block header, previously discussed.

The reason for this arrangement is that it may be possible to reduce the overall quantity of data to be transmitted; for example, a single motion vector or quantisation strategy may suffice for the whole picture, or a group of blocks; where an entire group of blocks does not require picture information to be transmitted, a single header will suffice. Also, non coding-related information concerning the picture may be inserted.

Typically the headers may include some or all of the following:

Picture header

Start code

Buffer state

Picture number (a modulo n number (e.g. n=64) incremented by 1 for each successive picture)

Type of picture (split-screen, document etc)

Group Header

Group position

Mode (intra/interframe)

Filter data

Type of quantisation

Code indicating whether information for the block is to follow

Group motion vector

These are assumed to be assembled in a header generator 28 and supplied to the write control unit 27.

At the start of each group of blocks the control unit 27 receives a 'group-of-blocks' header sequence. Also, at the start of each picture the unit 27 receives a 'picture' header sequence. This occurs while the FIFO 21 is filling up with the first block of coefficient data and the coder 25 is calculating the first block's overheads. The unit 27 stores the picture overheads and group overheads in the FIFO 22, along with their world identity codes (the word identity code indicates to the VLC coder which particular overhead the word represents).

At the beginning of the next block, i.e. the second block of that group, the control unit 27 receives the data from the precoder 25 and then decides, according to instructions within the data received from the precoder 25 and the 'group-of-blocks' and 'picture' header sequences, which of the overheads are to be transmitted and writes them to the FIFO 22, along with their associated word identity codes. (e.g. motion vector information may be omitted where the motion compensation code indicates that no motion vector is required, or where the information is carred by "group of blocks" header). Following this, if the signal CL indicates that coefficient data have been generated for the block, the unit 27 writes a unique SWITCH word to the FIFO 22, indicating that coefficient data is to be inserted at that point in the data stream, and then writes an end-of-block code.

There are four possible combinations of coefficient data from FIFO 21 and block overhead data from FIFO 22:

(i) No overheads and no coefficient data; in which case nothing is stored in either FIFO 21 of FIFO 22 for that block.

(ii) Overheads plus coefficient data, in which case overhead data, a SWITCH word and an end-of-block code are stored in FIFO 22, and coefficient data are stored in FIFO 21.

(iii) Overheads and no coefficient data, in which case overhead data are stored in FIFO 22, but no SWITCH word, end-of-block code or coefficient data are stored.

(iv) Coefficient data and no overheads; this can occur when the picture or group header contains sufficient information to characterise the block in question. In this case coefficient data is stored in FIFO 21, and a SWITCH word and an end-of-block code only are stored in FIFO 23.

The overhead data are written into the FIFO stores 21, 22 using video rate clock signals $\Phi_\omega$, read out is effected using a higher rate clock signal $\Phi_R$ when a read command is received from a control unit 29.

The object of the read control unit 29 is to read data from the two FIFO stores to intercalate the two types of data into a desired sequence as follows.

A picture header is followed by a group of blocks header or another picture header.

A group of blocks header is followed by block overhead data or another group of blocks header.

Block overhead data is followed by a block of coefficients (in which case the data contains the word SWITCH) or by further overhead data (SWITCH absent).

A group of coefficients is followed by block overheads or by a further group of coefficients.

In order to achieve this, the control unit 29 contains a read pointer which can toggle between a first state, in which it reads data from the FIFO store 22 and a second state in which it reads data from the FIFO store 21.

The pointer is represented for the purposes of illustration by a flip-flop 291 which when reset (first state) or set (second state) enables the passage of a read command to the relevant store gate 292 and 293.

Initially the unit is in the first state, and overhead data are read out, and forwarded to a buffer 30 until the presence of a SWITCH word—indicating that coefficient data is required for a block—is recognised by a SWITCH word recogniser 294 with toggles the unit into the second state. Thereupon coefficient data are read from the store 21 to the buffer 30. This continues until all the coefficients have been read out and a 'last coefficient' flag is detected by a flag detector 295 which returns the unit to the first state, whereupon further overhead data may be read. The control unit 29 then continues in this way reading from the two stores. If either store becomes empty, this is signalled to the control unit which delays any read command to the store in question until the signal disappears.

Thus, when overhead data are stored in FIFO 22 but no coefficient data are present in respect of that block then no SWITCH word is stored by the write control unit 27 or (hence) read by the control unit 29 and thus the latter continuously reads two or more successive blocks of overhead data. Conversely when a block of coefficients is stored in FIFO 21 but there is no associated overhead data then a SWITCH word and an end-of-block code will be written into FIFO 22 in respect of every such block of coefficients. This means that control unit 29 will react to each SWITCH word and read a block of coefficients from FIFO 21. At the end of each block, when the 'last coefficient' flag is received, the control unit 29 will return to read FIFO 22 until the next SWITCH word is encountered.

The overhead and coefficient data have now been assembled in to required sequence, albeit with gaps which occur when the FIFO stores 21, 22 become empty. Conventionally, conversion into variable length code would be carried out next, followed by entry into the buffer 30 for buffering into a continuous data stream for output, but buffering words of variable length requires complex shifting and control arrangements, for storage and retrieval of words of different lengths using a store of fixed word size. Therefore, in FIG. 2, the buffering is carried out first, by the buffer 30 already referred to, which is followed by a variable length coder 31 and parallel in serial out (PISO) resister 32.

The data read from FIFO stores 21, 22 are stored in the buffer 30 under control of the control unit 29 (except for the SWITCH word, which is of not further use). Since a constant bit rate is required at the output of the PISO 32, the buffer is not read at a constant rate; reading is controlled by a counter 33, as will be explained below. It will be recalled that each coefficient (or item of overhead information) is accompanied by a word identity code identifying which set of variable length codes is to be used. The data and word identity codes are supplied to the variable length coder 31 (which may be simply a lookup table in the form of a read-only memory) which outputs the coded data word to the register 32. They are supplied also to a further lookup table, length detector 34, which outputs the actual word length to the counter 33, to determine the number of output clock pulses $\Phi_L$ to be supplied to the register 31. The counter also serves, when the last clock pulse has been sent to the register 32, to issue a read command for read out of the next item of data (and its word identity code) from the buffer 30.

In order to enable continuous transmission at the fixed data rate determined by the PISO 32, it is necessary to incorporate feedback to the coder of FIG. 1 (and the quantiser 4 in particular), to adjust the rate of generation of data. Conventionally this is done on the basis of the state of fullness of an output buffer. Also, some decoders require transmission of the transmitter buffer state to assist in synchronisation operations at the decoder—as described in our European Pat. No. 0103380 and U.S. Pat. No. 4,562,466. In the present case, because the variable length coder follows the buffer, the actual data content of the buffer is not directly related to the number of transmitted bits which that content represents. Therefore it is necessary to determine what the buffer content would be if it were in variable length coded form. This is achieved as follows. Firstly, a length detector 35 (identical to the detector 34) is connected to receive the data and word identity codes supplied to the buffer input. The lengths that it produced are summed in an accumulator arrangement consisting of an adder 36 and latch 37, giving a running total of the number of coded bits represented by the data entered into the buffer.

The instantaneous value of this total is stored in the buffer along with the most recent item of data; when an item is read out, the total associated with it now indicates the total number of output bits represented by the data read out of the buffer. The difference between this and the input total (formed in a subtractor 38) is the "theoretical" buffer fullness which is communicated to the control unit 10 (via line 15 of FIG. 1) and may also be sent to the FIFO write control unit 27 if buffer state information is to be included in the transmitted overhead information. As shown, only the 8 most significant bits of the total are buffered and supplied to the subtractor; this gives a sufficient indication to prevent buffer overflow/underflow assuming a suitable buffer size.

Returning to the FIFO store 21, the transform coefficients may be coded in either one-dimensional or two-dimensional variable length code. If 1-dimensional variable length coding is used then every coefficient of each block, i.e. from the 'block start' to the last non-zero coefficient, is written into the FIFO store 21. For each coefficient the word identity code, generated within the select code insertion unit 23, is also written into the FIFO 21 as explained earlier (this indicates to the VLC coder which VLC code set to use for that coefficient). If 2-dimensional VLC is used then the unit 23 calculates, in addition, the run length of zeros before each non-zero coefficient, and writes this into the FIFO 21 along with the magnitude of the coefficient as a single word each time a non-zero coefficient is reached.

Figure 3:
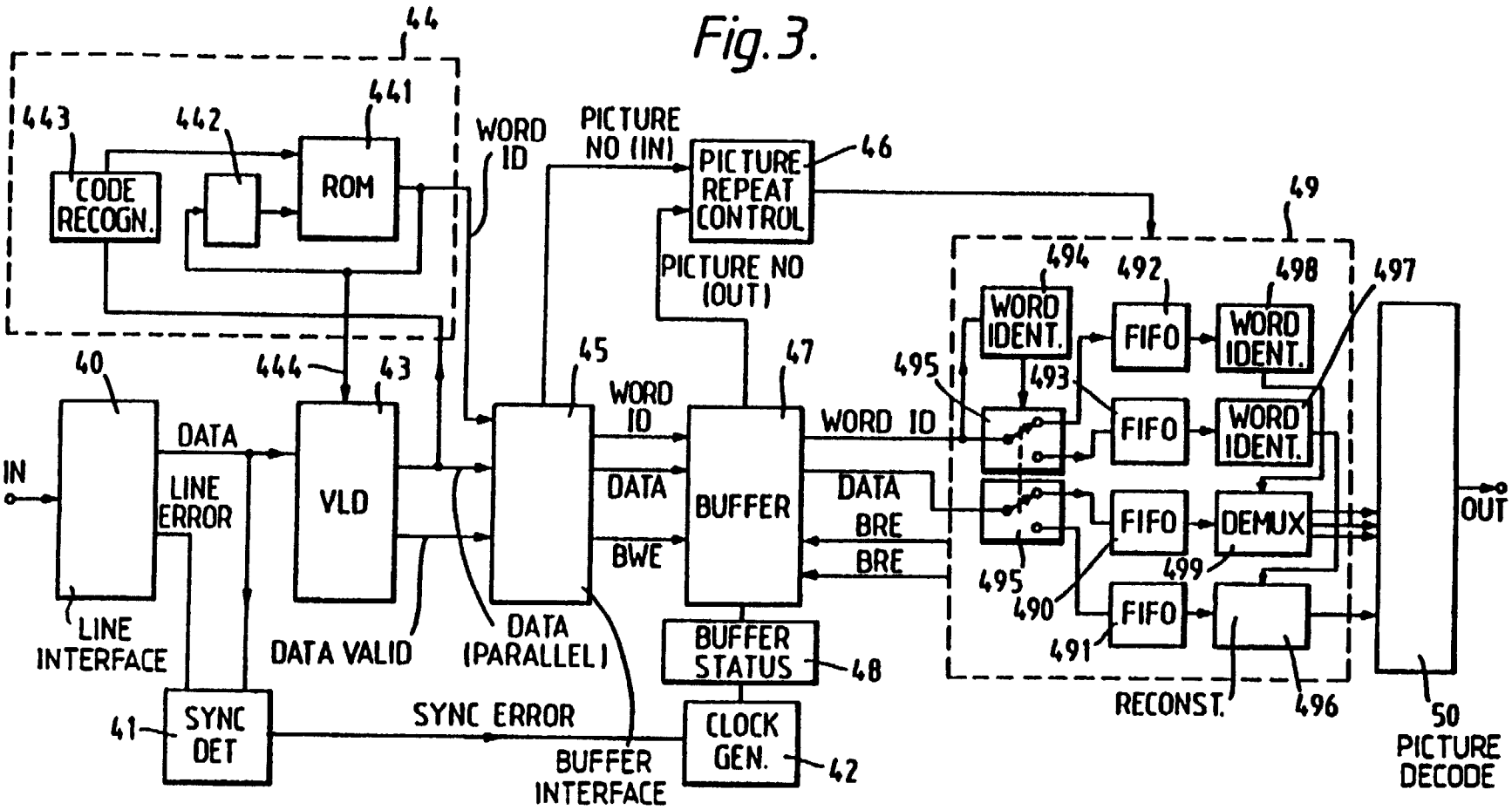
FIG. 3 is a block diagram of a suitable decoder.

Although the coder described above may be used with a conventional decoder, the decoder shown in FIG. 3 mirrors certain of the techniques used in the coder. Video data are received by a line interface unit 40 synchronous with a line clock of 2.048 MHz (or 1.544 MHz). The data is processed and passed on to a sync detector 41, together with indication of any line errors detected by the line interface unit.

The sync detector 41 continuously scans the received data stream for a picture start code (PSC) indicating the start of data for a new picture. If the code is incorrect, an error flag is set. The combination of the PSC error flag and the line error flag is passed to a clock generator unit 42.

At the start of a new picture, the serial data is received by a variable length decoder unit 43, and is decoded from fixed or variable length data into fixed length data and output in parallel form. For each item of data, a word identity is generated by a sequencer 44. This has a read-only memory 441 containing a sequence of stored words; a word read out is fed back via a latch 442 (clocked by an output from the variable length decoder—after each word has been decoded) to form the address for the next word. The memory is programmed so that, following resetting to a base address by a picture start code, it produces a sequence of word identity codes corresponding to the transmission sequence described earlier. Where the sequence can vary, the occurrence of words indicating the presence or absence of following optional fields is recognised in a recogniser 443 which controls the input to additional address lines of the memory 441 to change the sequence. In a similar fashion, detection of the beginning of the coefficient data causes the sequencer to enter a loop in which the relevant word identity repeatedly addresses itself, until the recognition of an end of block code causes a further change of sequence. The word identity is passed (together with a run length value for 2D variable length coded coefficients) to a buffer interface 45. If different variable length code sets are used for different parameters, the word identity labels can be used to signal to the VLC decoder 43 (via line 444) to select the appropriate code set.

The parallel output data from the variable length decoder, along with the word identity codes, are resynchronised in a buffer interface 45 to a multiple of the line clock, ie 6.176 MHz (or 6.144 Mhz for 1.544 Mbit/s line rate). The data are then passed to a buffer unit 47 together with a buffer write enable (BWE) signal 45. A further function of the buffer interface is to extract the picture number referred to earlier. This number is passed to a picture repeat control unit 46.

The buffer unit 47 acts as a rate convertor or elastic store which interfaces the incoming data which arrives at a regular rate, but becomes irregular after VLC decoding, to the picture related data which is used at a different irregular rate. A calculation of the buffer fullness or buffer status is made in a calculator unit 48 identical to units 35 to 38 inclusive in FIG. 2, and passed to the clock generator unit 42. The latest picture number read out of the buffer unit 47 is also extracted in this unit and passed to the picture repeat control unit 47.

The clock generator unit 42 generates a clock signal related to the picture element rate (ie 5.37 Mhz) and picture related synchronisation signals. The nominal clock frequency is generated as a default value and always used if line or PSC errors have been detected. However, it may be varied by the value of the buffer status.

Data are read out of the buffer unit 47 under the control of a demultiplexer unit 49, signalled by a buffer read enable (BRE) signal. The rate at which the data are extracted from the buffer unit 47 is determined by the picture data content. At the start of a 'picture' or 'group of blocks' sync signal from the clock generator unit, the demultiplexer 49 reads data from the buffer unit. The word identity of the data contents is checked as they are read and, once a picture start code is detected, further reads from the buffer unit are inhibited until the next picture signal or group of blocks signal. The input data are stored in first-in, first-out (FIFO) stores synchronised to 6.176 MHz (or 6.144 MHz) and readout of the FIFOs synchronised to a picture element rate of nominally 5.37 Mhz. There is a FIFO store 490 for the picture overheads, 491 for the coefficients, and 492 and 493 for the word identities of the overheads and coefficients respectively.

A word identity decoder 494 ascertains from the word identities read from the buffer whether the associated data word is coefficient data or overheads, and controls a demultiplexer 495 to direct it, and the associated word identity, to the appropriate FIFO store. The output of the coefficient data FIFO store 492 is reconstructed into blocks (496) with the aid of a word identity decoder 497 and fed to the picture data input of the decoder proper, 50, which can be of identical construction to the local decoder shown within the broken line box in FIG. 1. A further word identity decoder 498 serves to distinguish from the output of the word identity store 492, whether the output of the FIFO store 490 is a motion vector, filter, quantiser index, class, etc, and direct it via a demultiplexer 499 to the appropriate unit within the decoder 50.

The picture repeat control unit 46 checks that there are at least two picture start codes in the buffer unit 47 ready for the demultiplexer 49 to process a complete picture. If this condition is not maintained, the picture repeat control unit issues a picture repeat command to the demultiplexer, instructing it to stop reading the buffer and wait for the next picture sync signal before continuing its processing. The result is that the reconstituted picture is not updated with new information and is effectively repeated.

We claim:

1. A video coder comprising:

first coding means for generating, for blocks of picture elements of an image to be coded, image data indicative of the state of those elements;

second coding means for generating overhead data in respect of blocks and/or in respect of groups of blocks of picture elements, the overhead data including information as to the nature of coding employed by the first coding means;

a first buffer memory for storing the image data; a second buffer memory for storing the overhead data; means for inserting flags into the first and second buffer memories; and means for selectively reading data from either the first buffer or the second buffer memory, the reading means being responsive to the occurrence of a flag in the buffer memory being read to cease reading from that memory and to commence reading from the other memory, such that a desired sequence of image and overhead data is obtained.

2. A video coder comprising:

first coding means for generating, for blocks of picture elements of an image to be coded, image data indicative of the state of those elements;

second coding means for generating overhead data in respect of blocks and/or in respect of groups of blocks of picture elements, the overhead data including information as to the nature of coding employed by the first coding means;

a first buffer memory for storing the image data;

a second buffer memory for storing the overhead data;

means for inserting flags into the first and second buffer memories;

means for selectively reading data from either the first buffer or the second buffer memory, the reading means being responsive to the occurrence of a flag in the buffer memory being read to cease reading from that memory and to commence reading from the other memory, such that a desired sequence of image and overhead data is obtained; and means for encoding at least the image data by means of variable length codes.

3. A video coder comprising:

first coding means for generating, for blocks of picture elements of an image to be coded, image data indicative of the state of those elements;

second coding means for generating overhead data in respect of blocks and/or in respect of groups of blocks of picture elements, the overhead data including information as to the nature of coding employed by the first coding means;

a first buffer memory for storing the image data;

a second buffer memory for storing the overhead data;

means for inserting flags into the first and second buffer memories;

means for selectively reading data from either the first buffer or the second buffer memory, the reading means being responsive to the occurrence of a flag in the buffer memory being read to cease reading from that memory and to commence reading from the other memory, such that a desired sequence of image and overhead data is obtained; and in which at least the first coding means is such as to generate image data at a variable rate.

4. A video coder according to claim 3 including a buffer to permit the output of data at a constant rate and control means for controlling readout from the buffer, in which the control means is arranged to read from the buffer at a rate such that the rate of the encoded data is constant.

5. A video coder according to claim 4, including means for calculating the amount of data which will be produced by variable length coding of the instantaneous contents of the buffer.

6. A video coder according to claim 5 in which the calculating means includes means for determining, for each item of data entered into the buffer, the length of the corresponding coded word in accordance with the variable length code, means for accumulating the total of the lengths thus determined, and means for subtracting from this total the total of the word lengths corresponding to the items of data which have been read from the buffer.

7. A video coder according to claim 6 in which the control means is arranged to store in the buffer, along with an item of data, the said total of the lengths thus determined, and to read out that total from the buffer when the item of data is read out, thereby providing the total to be subtracted.

8. A video coder comprising:

means for generating from an input video signal data at a variable rate;

variable length coding means for encoding the data using a variable length code;

a buffer for interfacing to an output supplying data at a constant rate;

control means for controlling readout of data from the buffer, characterised in that the buffer precedes the variable length coding means, and that the control means is arranged to read from the buffer at a rate such that the rate of the encoded data is constant.

9. A video coder comprising:

means for generating from an input video signal data at a variable rate;

variable length coding means for encoding the data using a variable length code;

a buffer for interfacing to an output supplying data at a constant rate;

control means for controlling readout of data from the buffer, characterised in that the buffer precedes the variable length coding means, and that the control means is arranged to read from the buffer at a rate such that the rate of the encoded data is constant; and in which different items of data [rare] *are* to be encoded using different variable-length code sets, comprising means for producing for each item a label indicating which code set is to be used and recording the lables in the buffer, the coding means being arranged to respond to the labels read out to select the code set to be used.

10. A decoder for encoded video signals, comprising:

decoding means for decoding input data relating to changed parts of an encoded image in accordance with a variable length code, the data including image data and overhead data;

means for producing, for each item of decoded data, a label indicating the nature of the data;

means for inserting the data and labels into a buffer for interfacing the rate of the decoded data to that at which the data are to be utilised, and for reading the data and labels from the buffer, and means responsive to the labels to process the data for updating a stored decoded picture.

*11. A video coder comprising:* a generating means for generating, from an input video signal, data at a variable rate;

a variable length coding means for encoding the data using a variable length code as a series of coded words;

a buffer between the generating means and the variable length coding means; and a calculating means for calculating the total of the lengths of the coded words which will be produced by the variable length coding means from the instantaneous contents of the buffer.

*12. A video coder according to claim 11 in which the calculating means includes means for determining, for each item of data entered into the buffer, the length of the corresponding coded word in accordance with the variable length code, accumulator means for accumulating the total of the lengths thus determined, and subtraction means for subtracting from this total the total of the word lengths corresponding to the items of data which have been read from the buffer.*

*13. A video coder according to claim 12 including a control means arranged to store in the buffer, along with an item of data, the said total of the lengths thus determined, and to read out that total from the buffer when the item of data is read out, thereby providing the total to be subtracted to the subtraction means.*

*14. A video coder as claimed in claims 11, 12 or 13 in which the total of lengths thus determined is transmitted by the video coder as overhead information.*

*15. A video coder as claimed in claims 11, 12 or 13 in which the total of the lengths thus determined is used to control the generating means to vary the video signal data rate.*

* * * * *